Sept. 17, 1963
H. M. CRAIG ETAL
3,104,093
BLADE DAMPING DEVICE
Filed April 11, 1961
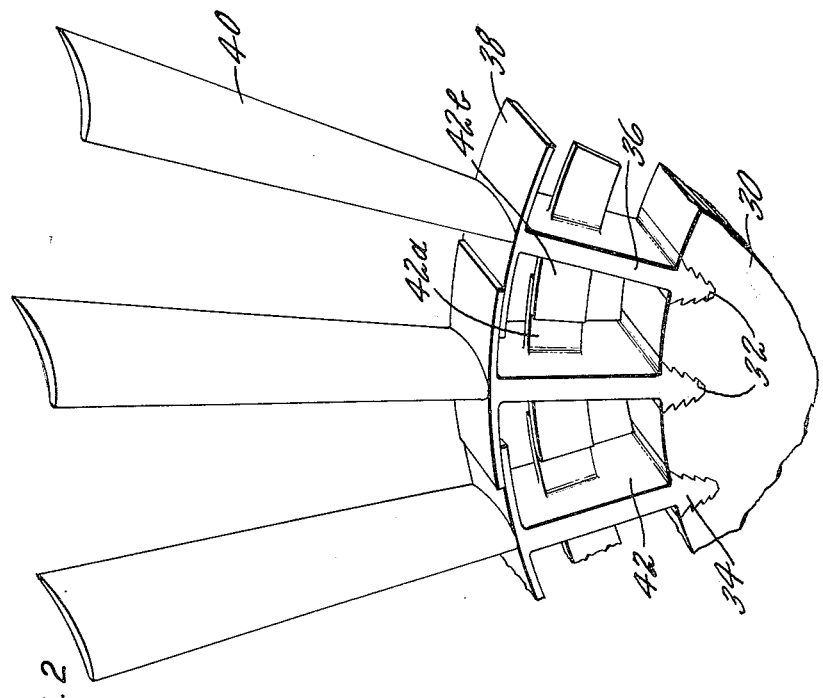
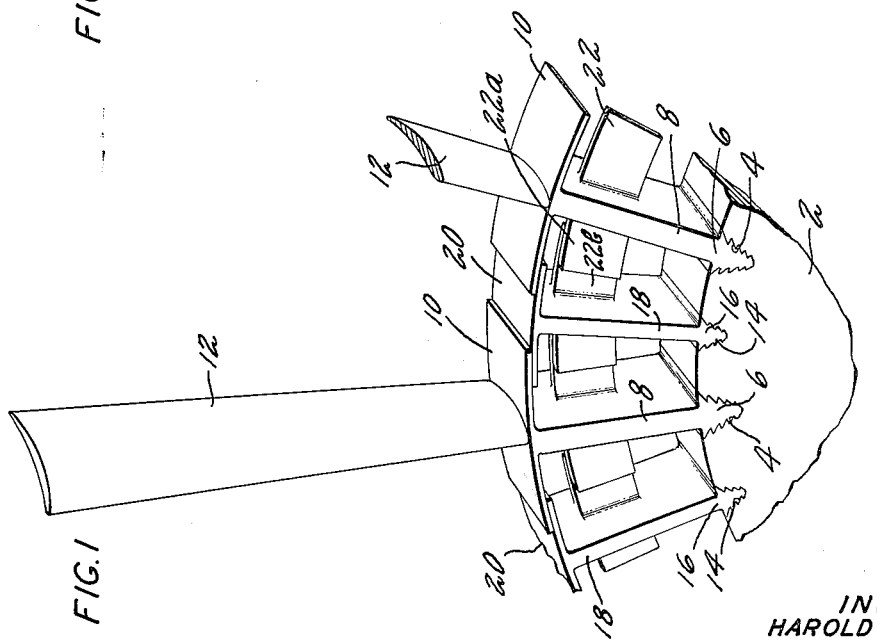
INVENTORS
HAROLD M. CRAIG
WILLIAM T. KEIRAN
CHARLES B. WILSON
BY Charles A. Warren
ATTORNEY United States Patent Office 3,104,093
Patented Sept. 17, 1963

3,104,093
BLADE DAMPING DEVICE
Harold M. Craig, Hartford, William T. Keiran, Ansonia, and Charles B. Wilson, East Hartford, Conn., assignors to United Aircraft Corporation, East Hartford, Conn., a corporation of Delaware
Filed Apr. 11, 1961, Ser. No. 103,679
7 Claims. (Cl. 253—77)

The invention relates to a blade damping device for use with turbine or compressor blades.

One feature of the invention is the use of cooperating frictional surfaces in a transverse radial plane which will effectively damp the blade vibration unaffected by centrifugal force. Another feature of the invention is the location of the damping elements radially inwardly of the airfoil portion of the blade so that the flow of gas through the device will not be impeded.

One feature is the combination of cooperating blade platform damping elements with other damping elements operating independenlty of the centrifugal loading resulting from rotation. Another feature is an arrangement for damping all modes of vibration whether of a resonant or flutter nature.

Other features and advantages will be apparent from the specification and claims, and from the accompanying drawings which illustrate an embodiment of the invention.

FIG. 1 is a fragmentary perspective view of a portion of a rotor showing the invention.

FIG. 2 is a fragmentary perspective view of a modifiication.

Referring first to FIG. 1, the rotor includes a disc 2 having a plurality of axial slots 4 in the periphery which receive blade roots 6 and which support the blade roots therein so that they will not move radially outward during rotation.

The roots 6 have radially projecting root extensions 8 to the outer ends of which the blade platforms 10 are attached. The airfoil portions 12 of the blades project radially outward from the platforms 10.

The disc 2 has other axially extending peripheral slots 14 positioned between the slots 4. The slots 14 receive root elements 16 having radially projecting extensions 18 thereon. At the outer ends of the elements 18 are platforms 20 which are positioned radially inward of the platforms 10 and in frictional engagement therewith. In the arrangement shown in FIG. 1 the extensions 18 and platforms 20 do not carry airfoil blade portions.

In addition to the damping effect resulting from the frictional contact between the platforms 10 and 20, the extensions 8 and 18 have circumferentially extending flanges 22 in a transverse radial plane and so arranged that a flange 22a on an extension 8 overlaps in a circumferential direction with the flange 22b on the extension 18. With this arrangement the frictional contact between each flange 22a and its overlapping cooperating flange 22b will damp any vibrations developing in the blade whether the vibration is of a resonant nature or of a flutter nature.

In assembly of a device arranged as shown in FIG. 1, the blade elements with the intervening spacer elements are assembled in a ring and the hub 2 is then positioned in the assembly of the blades and spacers. The blade platforms 10 and spacer platforms 20 define the inner wall of the gas path over the airfoil portion of the blades so that the flanges 22a do not interfere with the normal flow of gas or air as it passes over the airfoil portions of the blades.

In the arrangement of FIG. 2 the hub 30 has a plurality of axially extending circumferentially spaced peripheral slots 32 to receive blade roots 34. Each of these roots has a radially projecting root extension 36 at the outer end of which are blade platforms 38. Radially outward of the blade platforms are the airfoil portions 40 of the blades. The blade platforms 38 lie substantially in a circumferential plane and the adjacent edges of the platforms on contiguous blades overlap in a circumferential direction as shown for the purpose of vibration damping.

Each of the root extensions carries circumferentially extending flanges 42 all arranged in substantially radial planes with the flange 42a on one blade extension overlapping in a circumferential direction the flange 42b on the adjacent root extension. The assembly and functioning of this device is substantially the same as that of the device of FIG. 1.

It is to be understood that the inventon is not limited to the specific embodiment herein illustrated and described, but may be used in other ways without departure from its spirit as defined by the following claims.

We claim:

1. In a rotor construction, a hub having slots in the periphery thereof, a plurality of blades arranged around the periphery of the hub and having roots engaging said slots, each blade having an airfoil section and a root extension projecting radially outwardly from the root to the airfoil section, each blade having a platform at the junction of the root extension and the airfoil section, the root extensions of adjacent blades having projecting flanges thereon located radially inward of the platforms and positioned substantially at the same angle with respect to the axis of the hub, the flanges on adjacent blades overlapping and in frictional engagement, the contacting surfaces of the flanges on adjacent blades lying substantially in a transverse radial plane.

2. A rotor construction as in claim 1 in which the projecting flanges extend between the periphery of the hub and the airfoil section.

3. A rotor construction as in claim 1 the platforms for the several blades being substantially in a cylindrical surface and the platforms of adjacent blades overlapping and in frictional contact in a circumferential direction.

4. A rotor construction including a hub having slots in the periphery thereof, a plurality of blades arranged around the periphery of the hub and having roots engaging said slots, each blade having a root extension portion projecting substantially radially outward from and attached to the root thereof, a platform at the outer end of each root extension and an airfoil section extending outwardly from the platform, adjacent blades having on the root extension radially inward of the platforms circumferentially extending flanges overlapping circumferentially and in frictional engagement, said flanges being in transverse substantially radial planes.

5. A rotor construction as in claim 4 in which the platforms of adjacent blades also overlap in a circumferential direction and in which the overlapping portions of the platforms are in frictional engagement.

6. A rotor construction including a hub having a plurality of slots in the periphery thereof, elements projecting outwardly from said hub and having roots at their inner ends fitting in said slots, said elements having thereon, at points spaced radially outwardly from the roots, platform elements in the form of circumferentially projecting flanges defining a substantially cylindrical surface concentric to the hub axis, the flanges of adjacent elements overlapping in a circumferential direction and being in frictional engagement with each other, at least some of said elements having operative blade portions extending outwardly from said platforms, said elements also having other projecting flanges positioned substantially in a transverse radial plane, said last flanges on adjacent elements overlapping and in frictional engagement.

7. A rotor construction as in claim 6 in which said other flanges are located radially inward of and out of engagement with said first flanges.

References Cited in the file of this patent

UNITED STATES PATENTS

| | | |
|---|---|---|
| 2,398,140 | Heppner | Apr. 9, 1946 |
| 2,772,854 | Anxionnaz | Dec. 4, 1956 |
| 2,877,980 | Stalker | Mar. 17, 1959 |
| 2,922,620 | Shapiro | Jan. 26, 1960 |
| 2,936,155 | Howell et al. | May 10, 1960 |
| 2,990,156 | Marshall et al. | June 27, 1961 |

FOREIGN PATENTS

| | | |
|---|---|---|
| 989,556 | France | May 23, 1951 |
| 69,842 | France | Sept. 29, 1958 |
| | (1st addition to No. 1,033,197) | |
| 687,507 | Great Britain | Feb. 18, 1953 |
| 844,896 | Great Britain | Aug. 17, 1960 |